United States Patent

[11] 3,559,850

[72] Inventors Stanley M. Barkin
Somerville;
Alan Dillarstone, Highland Park, N.J.
[21] Appl. No. 822,747
[22] Filed May 7, 1969
[45] Patented Feb. 2, 1971
[73] Assignee Colgate-Palmolive Company
New York, N.Y.
a corporation of Delaware
Continuation of application Ser. No.
686,420, Nov. 29, 1967, now abandoned.

[54] METHOD OF AND DEVICE FOR HEATING PRODUCT DISPENSED FROM AEROSOL CONTAINER
4 Claims, 5 Drawing Figs.
[52] U.S. Cl. .................................................. 222/146, 219/292
[51] Int. Cl. ................................................... B67d 5/62
[50] Field of Search .................................. 219/(Inquired), 284, 292, 293, 295; 222/146(HA), 106, 402.12, 402.13

[56] References Cited
UNITED STATES PATENTS
2,963,265 12/1960 Goodspeed, Jr. .......... 222/402.13X
3,203,454 8/1965 Micallef ..................... 222/402.12X
3,144,174 8/1964 Abplanalp .................. 222/146(HA)

Primary Examiner—Samuel F. Coleman
Attorney—Strauch, Nolan, Neale, Nies & Kurz

ABSTRACT: A heater assembly for warming shaving cream being dispensed under pressure from an aerosol-type container which comprises a head adapted to be mounted on the depressible discharge valve stem of the container and having an internal chamber wherein discharging shaving cream flows through an annular passage between concentric electrodes electrically connected to a source of alternating current, the cream being conductive and heated by electrical action. In a specific form the warmed shaving cream collects in a cup closed by a hinged cover that controls a switch in the electrode circuit to close that circuit only when the cover is closed and open the circuit when the cover is open.

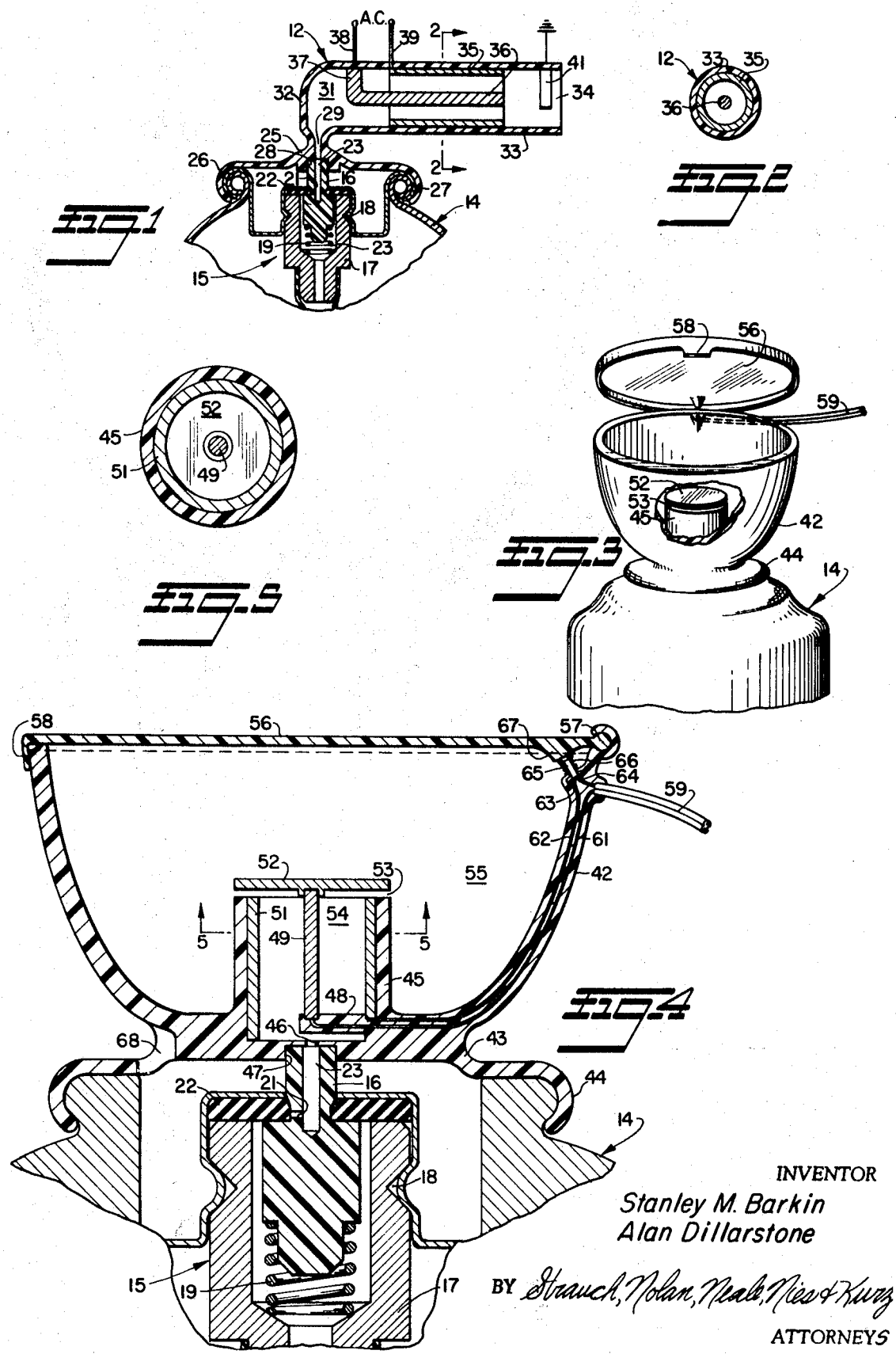

METHOD OF AND DEVICE FOR HEATING PRODUCT DISPENSED FROM AEROSOL CONTAINER

This case is a continuation of 684,420 filed Nov. 29, 1967, now abandoned.

BACKGROUND, FIELD AND SUMMARY OF INVENTION

The dispensing of shaving cream from aerosol containers is known. One practical objection from consumers is that they experience shock when cold lather or cream encounters the skin. A considerable number of expedients and devices have been proposed and marketed for removing this objectionable condition, any and many of these seek to warm the shaving cream during dispensing. Hot water and electrical heaters have been proposed. A difficulty with the former is that sufficiently hot water may not be available. Many of the latter require thermostatic units, safety fuses and like components adding to the complexity and expense.

The present invention relates to electrical heating of the shaving cream as it is dispensed from an aerosol-type container, and it represents an improvement over known devices of this type mainly with respect to safety and simplicity of structure without sacrificing reliability. The invention includes as an abject a novel method of warming h shaving cream.

Shaving cream is dispensed under pressure through a passage between coextensive electrodes connected to a source of electric current, the cream being conductive so as to become warmed by electrical action, and this is the major object of the invention.

A further object of e the invention is to provide a novel attachment for an aeorsol-type shaving cream or like material dispenser wherein the discharging material flows between concentric electrodes attached to opposite sides of an electric current source.

Another object of the invention is to provide a novel device for providing warm shaving cream or the like wherein shaving cream heated by passage between energized electrodes is discharged into a vessel having a cover connected to operate a switch in the electrode circuit.

BRIEF DESCRIPTION OF DRAWINGS

FIG. 1 is a diagrammatic section showing a heater assembly unit mounted on an aerosol container according to the invention in one embodiment;

FIG. 2 is a section on line 2—2 of FIG. 1 showing the electrode arrangement;

FIG. 3 is a fragmentary perspective view showing another structural embodiment of the invention;

FIG. 4 is an enlarged fragmentary section showing internal structure and electrode arrangements in the FIG. 3 embodiment; and FIG. 5 is a section on line 5—5 of FIG. 4 showing the electrode arrangement.

EMBODIMENTS OF THE INVENTION

FIG. 1 shows a heater unit assembly 12 mounted directly and detachably upon a conventional aerosol container 14.

The aerosol container 14 illustrated is of the general type disclosed in Abplanalp Pat. No. 2,631,814 having a top-mounted valve assembly 15 for controlling selective dish discharge under pressure of the n contents of the container. The valve assembly comprises a stem 16 vertically reciprocable within a body 17 suitably anchored rigidly to the container as at 18. A spring 19 biases stem 16 upwardly to valve-closed position where the lateral passage 21 is closed by the resilient sealing seat annulus 22. Passage 21 intersects a longitudinal stem passage 23 that extends to an open end within the upper end of the stem which projects above the container. When stem 16 is pushed sufficiently downwardly in FIG. 1 passage 121 moves below seat 22 to communicate with the interior bore 23 of body 17 and allow the pressurized contents of the container to discharge through bore 23 and a passages 21 and 23. When stem 16 is released, spring 2 19 recloses the valve to stop such discharge.

The heater assembly comprises a head structure 25 having a resilient base flange 26 fitted over the top metal bead 27 of container 14 for ready attachment and detachment. An enlarged bore 28 in the head receives the upper open end of stem 16 and has a passage 29 aligned with stem passage 23. At its upper end passage 29 enters an enlarged cylindrical chamber 31 closed at the adjacent end by wall 32 and contained within a laterally projecting boss 33 having an open outer end at 34.

Chamber 31 contains an annular metal electrode 35 preferably conforming to and secured upon the inner wall of boss 33. A central solid electrode 36 extends through electrode 35 in spaced relation, and its inner end is turned outwardly at 37 to be secured rigidly to the wall of boss 33 a where it is connected to input wire 38 from one side of an alternating current source, the other side of the source being connected to electrode 35 by input wire 29. Near the outer end of boss 33 an internally projecting metal terminal 41 is adapted to be connected to electrical ground as shown. The head structure is preferably a molded unit of non metallic electrically insulating plastic. Container 14 contains a supply of pressurized fluent shaving cream which is electrically conductive. Pressure downwardly on head 25 will flex the head sufficiently to depress stem 16 to permit discharge of the pressurized fluid shaving cream into and through chamber 31 to escape at opening mouth 34. As the shaving cream flows through chamber 31 it bridges the space between electrodes 35 and 36. Since the shaving cream is conductive and has relatively high electrical resistance it will be warmed during passage, and the cream exiting at mouth 34 will be warmed by electrical action to at least body temperature. The ground at 41 provides safety u in using this embodiment.

FIG. 3—5 illustrate another embodiment. Here the head structure 42 is an upwardly open cup having in its lower end a base 42 provided with a resilient flange 44 for ready attachment and detachment to container 14 as in the other embodiment.

Interiorly cup 42 is found with an upstanding integral hollow boss 45 having at its lower end a passage 46 that aligns with valve stem passage 23 when the stem has been received in bore 47 on the head base. At the lower end of boss 45 an integral radial post post 48 extends to the center of the boss to serve as a support for a metal electrode 49 fixed thereon and concentric with an annular metal electrode 51 rigidly lining the interior of box 45. Electrodes 49 and 51 are cylindrical. A deflector plate 52 is fixed on the upper end of electrode 49 and extends over the upper end of electrode 51 to define an annular discharge mouth 53 between the interior of chamber 54 of box boss 45 and the interior 55 of cup 42.

A transparent plastic cover 56 is hinged on one upper edge of the cup at 47 and has a latch 58 engaging the other side of the cup edge.

A cord 59 from an alternating current supply provides insulated boss 61 and 62, usually imbedded in the integral cup structure which is made of electrically insulating plastic, connected to electrodes 49 and 51 respectively. Wire 62 is interrupted to provide terminals 63 and 64 adapted to be bridged by a metal contact button 65 that when the cover 65 56 is urged by spring 66 away from the terminals to break the circuit. When cover 56 is closed a projection 67 thereon abuts button 65 to push it across the terminals and close the circuit of wire 62.

Head base 43 has a weakened section at 68 so that downward pressure on the cup will result in downward displacement of stem 16 until pressurized shaving cream flows through chamber 54 in to the interior of cup 42. This cream, being electrically conductive, is warmed by a par passage between the electrodes, so that a mass of warm shaving cream is provided within cup 42.

When the user opens cover 56 to scoop out the cream, the circuit to the electrodes is automatically opened at switch 63, 64, 65 so that the user is safe against accidental electrical shock and injury.

The invention may be embodied in other specific forms without departing from the spirit or essential characteristics thereof. The present embodiments are therefore to be considered in all respects as illustrative and not restrictive. the scope of the invention being indicated by the appended claims rather than by the foregoing description, and all a changes which come within the meaning and range of equivalency of the claims are therefore intended to be embraced therein.

We claim:

1. Apparatus for warming shaving cream or like material discharged from a pressurized source such as an aerosol container comprising a head structure having means for mounting it on said container with a passage in the head disposed to receive said discharging material, means for heating said material during discharge comprising spaced electrodes defining a path for material flow between them in contact therewith, means in the head defining a vessel receiving the heated material, a cover on said vessel, means in the head providing an electrical circuit to energize said electrodes, and a switch in said circuit that is connected to close and complete said circuit only when the cover is positioned to close the vessel, said head structure, means mounting it on the container and said cover comprising an enclosure of electrically insulating material protectively housing said electrodes and at least the adjacent end of said container.

2. Apparatus for warming shaving cream or like material discharged form a pressurized source such as an aerosol container comprising a head structure having means for mounting on s aid discharging material, means for heating said material during discharge comprising spaced electrodes defining a path for material flow between them in contact therewith, means in the head defining a vessel receiving the heated material, a cover on a said vessel, means in the head providing an electrical circuit to energize said electrodes, and a switch said circuit that is connected close and complete said circuit only when the cover is positioned to close the vessel.

3. The apparatus defined in claim 2, wherein said circuit comprises insulated wiring in the head structure, said switch is biased normally open and located on sad a said vessel, and a said cover has means of for operatively engaging said switch.

4. Apparatus for warming and i dispensing shaving cream being discharged from a pressurized source such as an aerosol container comprising a head structure having means for operative connection to receive said discharging shaving cream to a user thereof, means for heating said shaving cream comprising spaced electrically energizable electrodes within said head structure shaped to define an annular heating passage between them and through which passage said shaving cream is passed in contact therewith, deflector means at the outlet, end of said passage defining a substantially annular lateral discharge mouth for the heated shaving cram, and means on said head structure in the path of said heated shaving cream providing through said opening a region of user access to said heated shaving cream free of electrical shock danger comprising a shaving cream receiving space peripherally enclosed by a wall of electrically insulating me material, one of said electrodes being a metal cylinder, the other electrode being a metal rod extending coaxially therethrough and sad said deflector means being a plate fixed o the end of said rod in spaced relation to the adjacent end of said cylinder.

UNITED STATES PATENT OFFICE
CERTIFICATE OF CORRECTION

Patent No. 3,559,850　　　　　　　　Dated February 2, 1971

Inventor(s) Stanley M. Barkin and Alan Dillarstone

It is certified that error appears in the above-identified patent and that said Letters Patent are hereby corrected as shown below:

Abstract page; Column 1, line 2, after "Somerville" insert --, N. J.--
Column 1, line 24, "abject" should be --object--.
　　　　　, line 24, delete "h".
　　　　　, line 30, delete "e".
　　　　　, line 61, delete "dish".
　　　　　, line 62, delete "n".
　　　　　, line 71, "121" should be --21--.
　　　　　, line 73, delete "a".
　　　　　line 74, "219" should be --19--.
Column 2, line 14, delete "a".
　　　　　, line 17, "29" should be --39--.
　　　　　, line 33, delete "u".
　　　　　, line 36, "42" should be --43--.
　　　　　, line 43, delete "post" (first occurrence).
　　　　　, line 46, "box" should be --boss--.
　　　　　, line 51, delete "box".
　　　　　, line 53, "47" should be --57--.
　　　　　, line 56, delete "boss" and insert --wires--.
　　　　　, line 60, delete "65", (second occurrence).
　　　　　, line 69, delete "a par".
Column 3, line 6, delete "a".
　　　　　, line 27, change "form" to --from--.
　　　　　, line 28, after "mounting" insert --it on said con with a passage in the head disposed to r ceive--.
　　　　　, line 29, delete "on".
　　　　　, line 29, change "s aid" to --said--.

UNITED STATES PATENT OFFICE
CERTIFICATE OF CORRECTION

Patent No. 3,559,850   Dated February 2, 1971

Inventor(s) Stanley M. Barkin and Alan Dillarstone

It is certified that error appears in the above-identified patent and that said Letters Patent are hereby corrected as shown below:

Page 2 continued.

Column 4, line 3, after "switch" insert --in--.
, line 4, after "connected" insert --to--.
, line 8, delete "sad a".
, line 9, delete --of--.
, line 10, delete "i".
, line 14, after the first "cream" insert --and hav an outlet opening for supplying heated shaving cream--.
, line 20, change "cram" to --cream--.
, line 25, after "insulating" delete --me--.
, line 28, after "and" delete --sad--.
, line 29, change "o" to --on--.

Signed and sealed this 8th day of June 1971.

(SEAL)
Attest:

EDWARD M. FLETCHER, JR.
Attesting Officer

WILLIAM E. SCHUYLER, JR
Commissioner of Patents